(12) United States Patent
Li et al.

(10) Patent No.: US 8,661,794 B2
(45) Date of Patent: Mar. 4, 2014

(54) DIESEL EXHAUST FILTER

(75) Inventors: Cheng G. Li, Midland, MI (US); Robin Ziebarth, Midland, MI (US); Martin C. Cornell, Lake Jackson, TX (US); Steven B. Swatzmiller, Flemington, NJ (US)

(73) Assignee: Dow Global Technologies LLC, Midland, MI (US)

( * ) Notice: Subject to any disclaimer, the term of this patent is extended or adjusted under 35 U.S.C. 154(b) by 1431 days.

(21) Appl. No.: 10/567,006

(22) PCT Filed: Aug. 27, 2004

(86) PCT No.: PCT/US2004/027852
§ 371 (c)(1),
(2), (4) Date: Jan. 31, 2006

(87) PCT Pub. No.: WO2005/021138
PCT Pub. Date: Mar. 10, 2005

(65) Prior Publication Data
US 2006/0193757 A1    Aug. 31, 2006

Related U.S. Application Data

(60) Provisional application No. 60/499,130, filed on Aug. 29, 2003.

(51) Int. Cl.
| F01N 3/00 | (2006.01) |
|---|---|
| F01N 3/10 | (2006.01) |
| F01N 3/02 | (2006.01) |
| B01D 24/00 | (2006.01) |
| B01D 39/06 | (2006.01) |
| B01D 39/20 | (2006.01) |
| B01D 39/14 | (2006.01) |

(52) U.S. Cl.
USPC ............... 60/297; 60/299; 60/311; 55/523; 55/524

(58) Field of Classification Search
USPC ....... 60/286, 295, 297, 299, 311; 55/DIG. 30, 55/523, 524; 422/171, 177
See application file for complete search history.

(56) References Cited

U.S. PATENT DOCUMENTS

| 4,533,647 A | 8/1985 | Tien |
|---|---|---|
| 4,714,694 A | 12/1987 | Wan et al. |

(Continued)

FOREIGN PATENT DOCUMENTS

| EP | 0766993 B1 | 3/2003 |
|---|---|---|
| GB | 1119180 | 7/1968 |
| WO | 02085482 A2 | 10/2002 |

OTHER PUBLICATIONS

Marcus F. M. Zwinkels, et al; "Preparation of Combustion Catalysts by Washcoating Alumina Whiskers-covered Metal Monoliths Using a Sol-gel Method"; Preparation of Catalysts VI, pp. 85-94; 1995 Elsevier Science B.V.

*Primary Examiner* — Kenneth Bomberg
*Assistant Examiner* — Audrey K Bradley

(57) ABSTRACT

An improved Diesel exhaust filter element of the type having a rigid porous wall portion formed of an acicular ceramic (such as acicular mullite), the porous wall portion having a first side and a second side, the porous wall portion being coated with a precious metal catalyst and a $No_x$ absorbent, such that when exhaust gas from a Diesel engine is flowed through the rigid porous wall from the first side to the second side, the exhaust gas containing excess oxygen, Nox and soot, the soot in the exhaust gas in trapped within the rigid porous wall and catalytically oxidized to carbon dioxide, the NO is catalytically oxidized to $NO_2$, which $NO_2$ is then absorbed by the $No_x$ absorbent, and such that when the exhaust gas is caused to contain excess hydrocarbon and carbon monoxide, then the $No_x$ absorbent is regenerated and the remaining hydrocarbon and carbon monoxide are catalytically converted to nitrogen and carbon dioxide. In addition, a process for depositing precipitated metal ions on the surfaces of such a rigid porous wall.

10 Claims, 4 Drawing Sheets

(56) References Cited

U.S. PATENT DOCUMENTS

| | | | |
|---|---|---|---|
| 4,965,243 A | 10/1990 | Yamada et al. | |
| 5,098,455 A | 3/1992 | Doty et al. | |
| 5,198,007 A * | 3/1993 | Moyer et al. | 55/523 |
| 5,733,352 A | 3/1998 | Ogawa et al. | |
| 5,974,791 A * | 11/1999 | Hirota et al. | 60/276 |
| 6,006,516 A | 12/1999 | Voss et al. | |
| 6,256,984 B1 | 7/2001 | Voss et al. | |
| 6,306,335 B1 | 10/2001 | Wallin et al. | |
| 6,546,721 B2 | 4/2003 | Hirota et al. | |
| 6,803,015 B2 * | 10/2004 | Vance et al. | 264/628 |
| 6,912,847 B2 * | 7/2005 | Deeba | 60/297 |
| 7,189,375 B2 * | 3/2007 | Molinier et al. | 422/171 |
| 2001/0032459 A1 | 10/2001 | Hirota et al. | |
| 2002/0175451 A1 | 11/2002 | Vance et al. | |
| 2007/0104623 A1 * | 5/2007 | Dettling et al. | 422/177 |

* cited by examiner

DIESEL EXHAUST FILTER

PRIORITY

This application claims priority from U.S. Provisional Application No. 60/499,130 filed 29 Aug. 2003.

FIELD

The instant invention is in the field of exhaust gas filters and more specifically, the instant invention is in the field of exhaust gas filters for Diesel engines.

BACKGROUND

Catalytic converters are well known for the control of nitrogen oxide, hydrocarbon and carbon monoxide emissions from automobiles and trucks having gasoline engines. The exhaust gas is flowed past a solid material, in the form of a pellet or a honeycomb, which has been coated with a catalyst. The offensive gases diffuse to the catalyst and are catalytically converted to non-offensive or less-offensive gases such as water vapor, nitrogen and carbon dioxide. Such catalytic converters are not effective in controlling emissions from automobiles and trucks having Diesel engines because the exhaust from a Diesel engine contains much more soot and excess oxygen than the exhaust from a gasoline engine.

Exhaust filters have been developed for Diesel engines. For example, U.S. Pat. No. 5,098,455, herein fully incorporated by reference, disclosed a regenerable exhaust gas filter comprising an acicular mullite filter media. The exhaust gas was passed through the acicular mullite filter media to trap the soot particles. Periodically, the trapped soot particles are ignited to regenerate the filter.

As reported by Corning, a nitrogen oxide adsorber unit and Diesel oxidation unit have been used downstream of a soot filter unit to control soot, nitrogen oxides and hydrocarbon emissions from a Diesel engine (Johnson, T., Developing Trends—Diesel Emission Control Update, Aug. 7, 2001). A general treatment of the subject of diesel exhaust filters is given by Heck and Farrauto in the text book entitled CATALYTIC AIR POLLUTION CONTROL—COMMERCIAL TECHNOLOGY, 2002, ISBN0-471-43624-0 and especially in Chapters 8 and 9 thereof.

United States Patent Application Publication US 2001/0032459 A1, disclosed a Diesel exhaust gas purification system having a rigid porous wall filter element coated with a mixture of a precious metal catalyst and a nitrogen oxide absorber, such that when exhaust gas from a Diesel engine is flowed through the rigid porous wall under normal operating conditions the soot in the exhaust gas is trapped within the rigid porous wall and catalytically oxidized to carbon dioxide while the nitrogen oxide is catalytically oxidized to $NO_2$, which $NO_2$ is then absorbed by the nitrogen oxide absorbent. The system of the '459 patent publication is regenerated by making the exhaust gas contain excess hydrocarbon and carbon monoxide so that the absorbent is regenerated by releasing NOx, which NOx and the remaining hydrocarbon and carbon monoxide are catalytically converted to nitrogen and carbon dioxide.

The system of the '459 patent publication was an important advance in the art but the porous wall material used (cordierite) is less porous than desired (requiring a larger unit to control back pressure) and the overall cost effectiveness of a device made according to the '459 patent publication was less than desired.

SUMMARY OF THE INVENTION

The instant invention provides a single unit for the control of soot, nitrogen oxides, carbon monoxide and hydrocarbon emissions from Diesel engine exhaust having improved overall performance and cost characteristics. More specifically, the instant invention is an improved Diesel exhaust filter element of the type having a rigid porous wall portion, the porous wall portion having a first side and a second side, the porous wall portion being coated with a precious metal catalyst and a $NO_x$ absorbent, such that when exhaust gas from a Diesel engine is flowed through the rigid porous wall from the first side to the second side, the exhaust gas containing excess oxygen, NOx and soot, then the soot in the exhaust gas is trapped within the rigid porous wall and catalytically oxidized to carbon dioxide, the NO is catalytically oxidized to $NO_2$, which $NO_2$ is then absorbed by the $NO_x$ absorbent; and such that when the exhaust gas contains excess hydrocarbon and carbon monoxide, then the $NO_x$ absorbent is regenerated and the remaining hydrocarbon and carbon monoxide are catalytically converted to nitrogen and carbon dioxide. The improvement comprises the use of an acicular ceramic (such as acicular mullite) in the rigid porous wall.

In a related embodiment, the instant invention is an improved Diesel exhaust filter element of the type having a rigid porous wall portion, the porous wall portion having a first side and a second side, such that when exhaust gas from a Diesel engine is flowed through the rigid porous wall from the first side to the second side, soot in the exhaust gas is trapped within the rigid porous wall. The improvement comprises: the rigid porous wall comprising three layers, the first layer being adjacent the first side of the rigid porous wall, the first layer comprising a Diesel oxidation catalyst, the third layer being adjacent the second side of the rigid porous wall, the third layer comprising a three way catalyst, the second layer being between the first layer and the third layer, the second layer comprising a nitrogen oxide adsorber, the second layer comprising an acicular ceramic such as acicular mullite.

In yet another related embodiment, the instant invention is an improved Diesel exhaust filter element of the type having a rigid porous wall portion, the porous wall portion having a first side and a second side, such that when exhaust gas from a Diesel engine is flowed through the rigid porous wall from the first side to the second side, soot in the exhaust gas is trapped within the rigid porous wall. The improvement comprises: the rigid porous wall comprising two layers, the first layer being adjacent the first side of the rigid porous wall, the first layer comprising a Diesel oxidation catalyst, the second layer being between the first layer and the second side of the rigid porous wall, the second layer comprising a nitrogen oxide adsorber and a three way catalyst, the second layer comprising an acicular ceramic such as acicular mullite.

The instant invention is also a process for depositing precipitated metal ions on the surfaces of a rigid porous wall such as an acicular ceramic. The process comprises four steps. The first step is to form a liquid solution comprising metal ions, a gelling agent and a precipitating agent in a solvent, the concentration of gelling agent being sufficient to gel the liquid solution at an elevated temperature, the precipitating agent being unstable at elevated temperature so that the precipitating agent decomposes to produce a product that precipitates at least a portion of the metal ion to form a precipitated metal ion. The second step is to fill at least a portion of the pore volume of the rigid porous wall with the liquid solution to form a filled structure. The third step is to elevate the temperature of the filled structure to gel the liquid solution and to precipitate metal ion. The fourth step is to further elevate the temperature of the filled structure to vaporize the solvent and the gelling agent from the filled structure leaving behind precipitated metal ion deposited on at least a portion of the surfaces of the rigid porous wall.

DETAILED DESCRIPTION OF THE INVENTION

Figure 1:
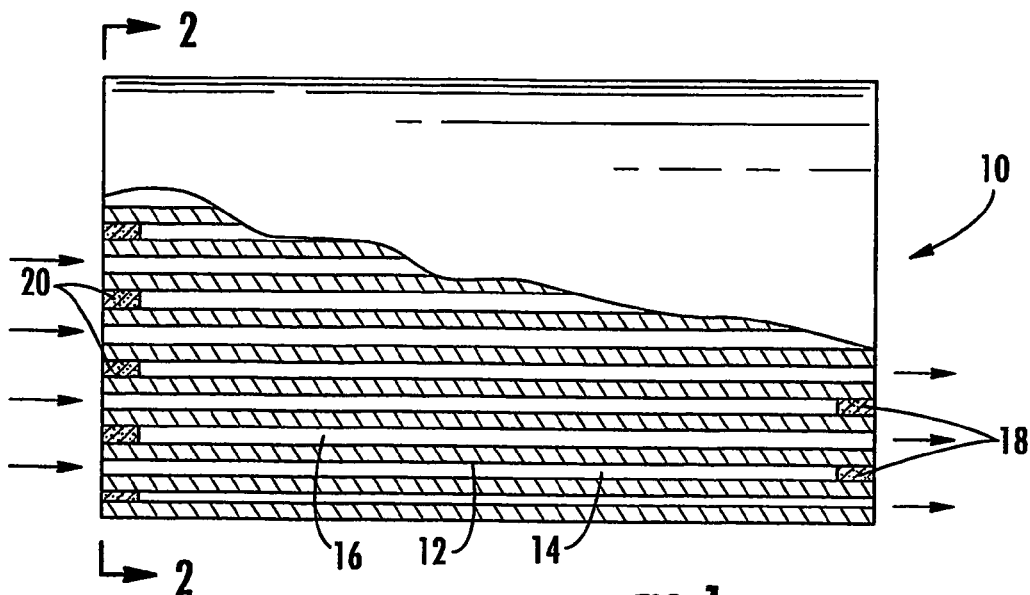
FIG. 1 shows a partial cut-away view of a side of the Diesel filter/catalytic converter constructed in accordance with the instant invention, wherein the channels and channel end plugs are visible as well as a cross-section of the walls separating the channels.

Referring now to FIG. 1, therein is shown a Diesel exhaust filter 10 constructed in accordance with the instant invention. Rigid porous channel walls 12 comprising acicular ceramic separate intake channels 14 from exhaust channels 16. The intake channels are formed by plugging their downstream ends with plugs 18 while the exhaust channels are formed by plugging their upstream ends with plugs 20.

Figure 2:
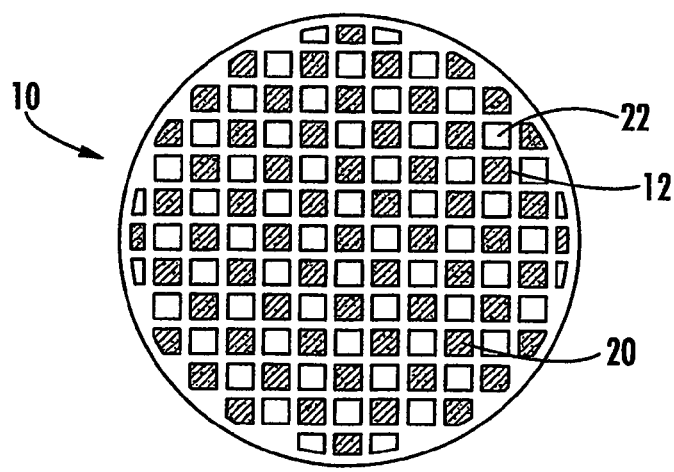
FIG. 2 shows an end view of the Diesel filter/catalytic converter of FIG. 1, revealing the ends of the channel, which are alternatively plugged and unplugged.

Referring now to FIG. 2, a view depicting the upstream end of the Diesel filter is seen from its side. Upstream ends 22 of the intake channels are seen surrounded by the channel walls 12. Also surrounded by the channel walls re plugs 20 for the upstream ends of the exhaust channels. As can be seen from FIG. 2, adjacent intake and exhaust channels alternate positions along rows as well as along columns.

Figure 3:
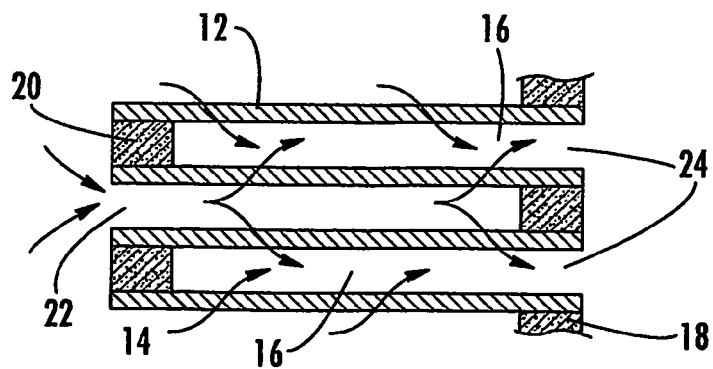
FIG. 3 depicts the channels more clearly and the direction of flow of the Diesel exhaust gases.

Referring now to FIG. 3, depicting the detail of the channels, we see where the gases enter into the upstream end 22 of intake channel 14, flow through walls 12, and exit through the downstream ends 24 of exhaust channels 16. In this embodiment of the instant invention, the plugs that seal up the ends of the channels determine which channels serve as intake channels and which channels serve as exhaust channels. An intake channel is formed by leaving the channel end open at the upstream end of the filter while sealing the end of the same channel at the downstream end of the filter. This way, the gases enter the upstream end of the channel and are forced to flow through the surrounding walls of the channel. Likewise, an exhaust channel is formed by plugging up the channel end at the upstream end of the filter while leaving the end of the same channel open at the downstream end of the filter. This way, the gases flowing through the surrounding walls into the exhaust channel will be allowed to flow freely out of the downstream end of the channel while being blocked from flowing out the upstream end.

The walls 12 of the filter 10 must be capable of trapping and retaining the soot particles of Diesel exhaust gases, while at the same time allowing the gases themselves to flow through the walls without excessive resistance. The filter 10 naturally offers a certain amount of resistance to the flow of exhaust gases there through. This resistance is due, to a small degree, to the restrictive nature of the narrow channels along which the exhaust gases must travel, but is largely due to the finite permeability of the channel walls 12 through which the gases are forced to flow. The result of this resistance to the flow of exhaust gases through the filter 10 is that a pressure drop develops from the upstream end to the downstream end of the filter 10. In Diesel engine application, this pressure drop is undesirable since it causes the engine to experience increased backpressure, which reduces the engine's efficiency and ultimately causes the engine to shut down. This backpressure is maintained at an acceptably low level in the instant invention by using a sufficiently large surface area of wall 12 together with a sufficient permeability of the wall 12 to the flow of the exhaust gases.

The wall 12 comprises acicular ceramic such as acicular mullite. The average pore size and pore size distribution of the porous medium is important. If the pore size is too large, then too many of the soot particles will pass through the wall 12 and not be trapped therein. On the other hand, if the pore size of the porous medium is too small, then the area of the wall 12 needed (and thus the volume and weight of the filter 10) will be relatively large for an acceptable backpressure. Preferably, the porosity (i.e., the volume percent of the porous medium that is open pore) of the porous medium is relatively high, for example, higher than 50 percent, so that a given area of wall is used more efficiently. An average pore size of between about ten and twenty micrometers is preferable.

The thickness of the wall 12 is also a factor to be considered. The thicker the wall 12 (for a given area of the wall 12), the more time the exhaust gas is exposed to any catalyst therein. However, a relatively thick wall 12 also results in a relatively higher the backpressure. Preferably, the thickness of the wall 12 is in the range of from about one quarter of one millimeter to ten millimeters.

The preferred material for the porous medium of the wall 12 is the interlaced network of fused elongated crystals of mullite as disclosed in U.S. Pat. No. 5,098,455. Such mullite can be termed "acicular mullite". Acicular mullite is highly preferred as the porous medium in the instant invention because acicular mullite can have excellent strength, excellent heat-resisting characteristics and excellent permeability characteristics.

It should be understood that the specific geometry of a filter of the instant invention is not critical. For example, the filter of the instant invention can be in the form of a shell and tube device where the tubes are formed of the porous medium. Alternatively, (and without limitation) the porous medium of the instant invention can be in the form of a spiral wound sheet plumbed and sealed in a container. Thus, any geometry can be used in the instant invention as long as the exhaust gas flows through a rigid porous wall portion of the filter.

Figure 4:
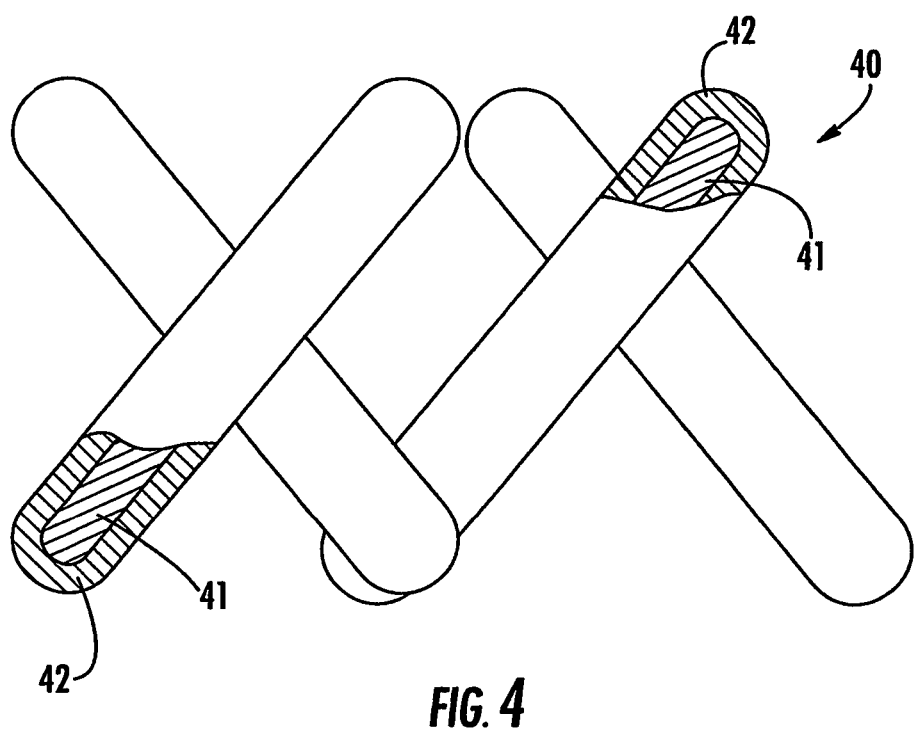
FIG. 4 depicts a rigid porous wall structure consisting of acicular mullite coated with a mixture comprised of platinum, rhodium, palladium and barium oxide.

Referring now to FIG. 4, therein is shown an embodiment 40 of the instant invention wherein the Diesel oxidation, $NO_x$ absorption and three way catalyst functions are accomplished using a single coating 42 on an acicular mullite 41. The coating 42 can any of the materials described in United States Patent Publication 2001/0032459 A1. In other words, the coating 42 contains a precious metal catalyst (and preferably a mixture of precious metals) to serve as a Diesel oxidation catalyst (preferably platinum in the range of from 5-150 grams per 28.3 liters), a $NO_x$ absorbent (preferably barium oxide at a relatively high level, e.g., ten percent by volume) and a three way catalyst (preferably a mixture of platinum in the range of from 0.1 to 10 grams per liter, rhodium in the range of from 0.02 to 2 grams per liter and palladium in the range of from 0.1 to 10 grams per liter as well as other ingredients such as alumina, active alumina, cerium oxide and zirconium oxide, see, for example, U.S. Pat. Nos. 4,965,243 and 4,714,694. A sulfur oxide (SOx) absorber can also be used in the instant invention. For example, the system shown in FIG. 4 can have its inlet side coated with a layer comprising a SOx absorber.

Figure 5:
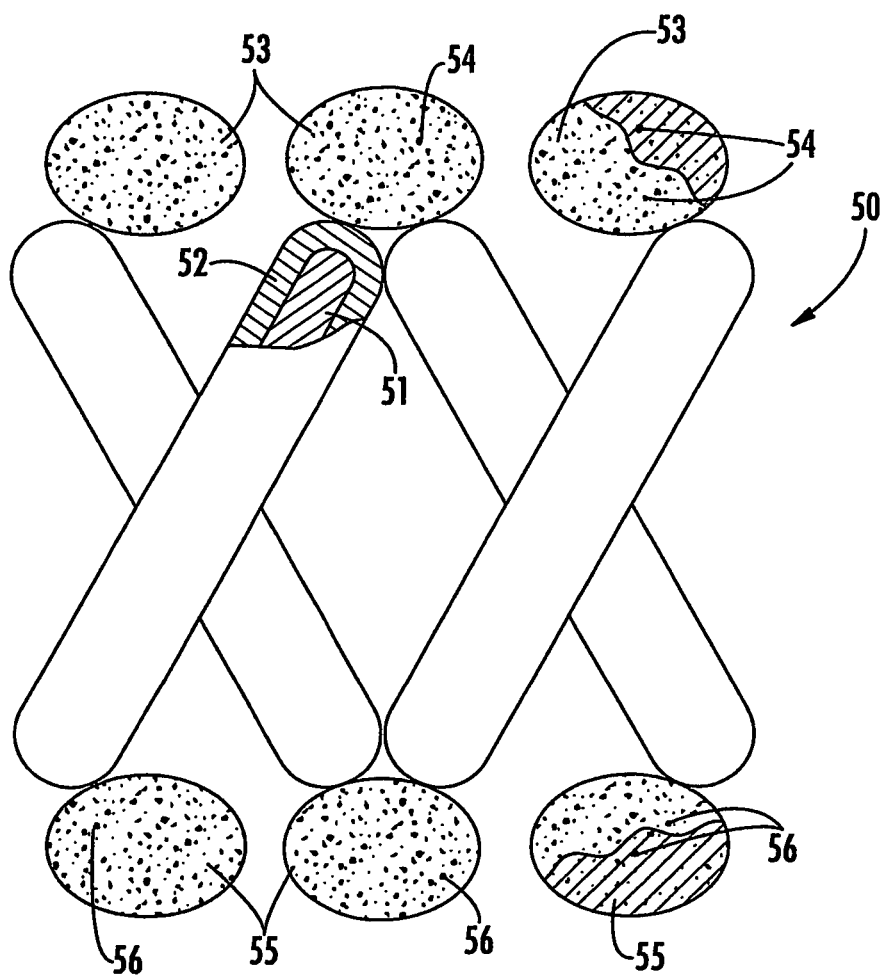
FIG. 5 depicts a rigid porous wall structure consisting of acicular mullite coated with alumina, platinum and barium oxide, having an upper layer of alumina particles impregnated with platinum and a lower layer of alumina particles impregnated with platinum and rhodium.

Referring now to FIG. 5, therein is shown a highly preferred embodiment 50 of the instant invention wherein the Diesel oxidation, $NO_x$ absorption and three way catalyst functions are accomplished using separate layers. The middle layer is comprised of acicular mullite 51 coated with a mixture of alumina, platinum and barium oxide 52 which barium oxide serves as a $NO_x$ absorbent. The upper layer is comprised of porous alumina particles 53 impregnated and coated with platinum 54 (or other suitable precious metal catalyst) which serves as a Diesel oxidation catalyst (preferably the platinum concentration is in the range of from 5-150 grams per 28.3 liters of filter element.) The lower layer is comprised of porous alumina particles 55 impregnated and coated with a mixture comprised of precious metal catalysts 56 (preferably a mixture of platinum in the range of from 0.1 to 10 grams per liter, rhodium in the range of from 0.02 to 2 grams per liter and palladium in the range of from 0.1 to 10 grams per liter as well as other ingredients such as active alumina, cerium oxide and zirconium oxide, see, for example, U.S. Pat. No. 4,965,243. The embodiment shown in FIG. 5 is highly efficient both in operational performance and in economic use of expensive precious metals.

Figure 6:
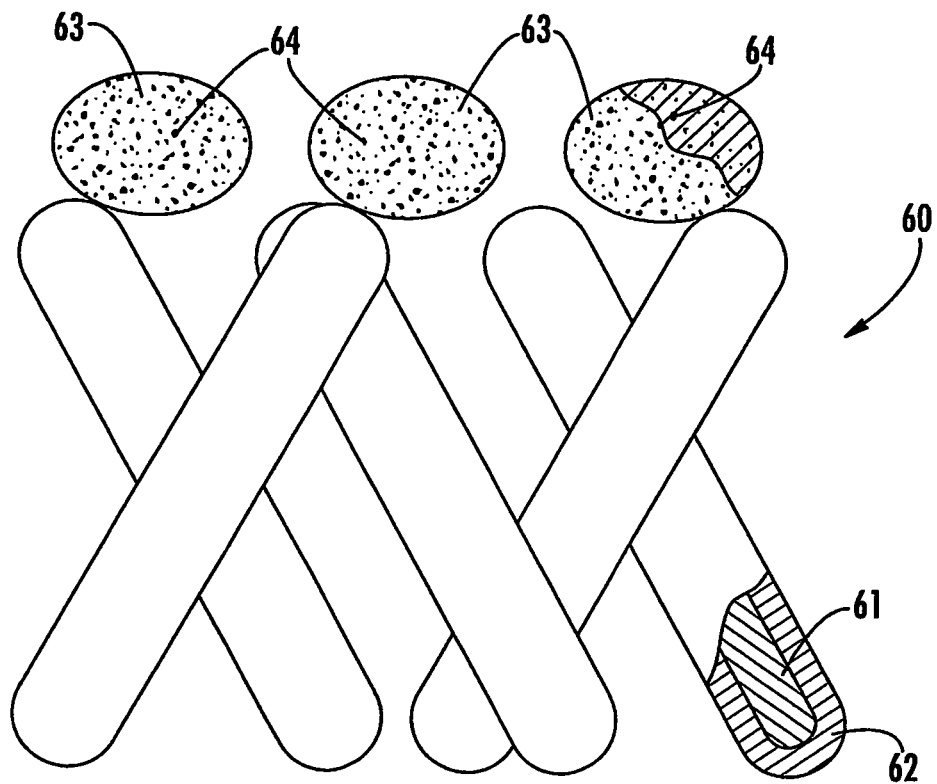
FIG. 6 depicts a rigid porous wall structure consisting of acicular mullite coated with a mixture comprised of barium oxide, platinum and rhodium and having an upper layer of alumina particles impregnated with platinum.

Referring now to FIG. 6, therein is shown an embodiment 60 of the instant invention wherein the $NO_2$ absorption and three way catalyst functions are accomplished using a mixed coating 62 on an acicular mullite 61 while the Diesel oxidation function is accomplished using a coating of precious metal catalyst 64 impregnated in and coated on an porous alumina particle 63. The coating 62 comprises a $NO_x$ absorbent (preferably a mixture of alumina and barium oxide at a relatively high level, e.g., ten percent by volume) and a three way catalyst preferably a mixture of platinum in the range of from 0.1 to 10 grams per liter, rhodium in the range of from 0.02 to 2 grams per liter and palladium in the range of from 0.1 to 10 grams per liter as well as other ingredients such as active alumina, cerium oxide and zirconium oxide, see, for example, U.S. Pat. No. 4,965,243. The coating 64 is comprised of a precious metal catalyst (preferably platinum having a concentration in the range of from 5-150 grams per 28.3 liters of filter element). The embodiment shown in FIG. 6 is also highly efficient both in operational performance and in economic use of expensive precious metals.

Figure 7:
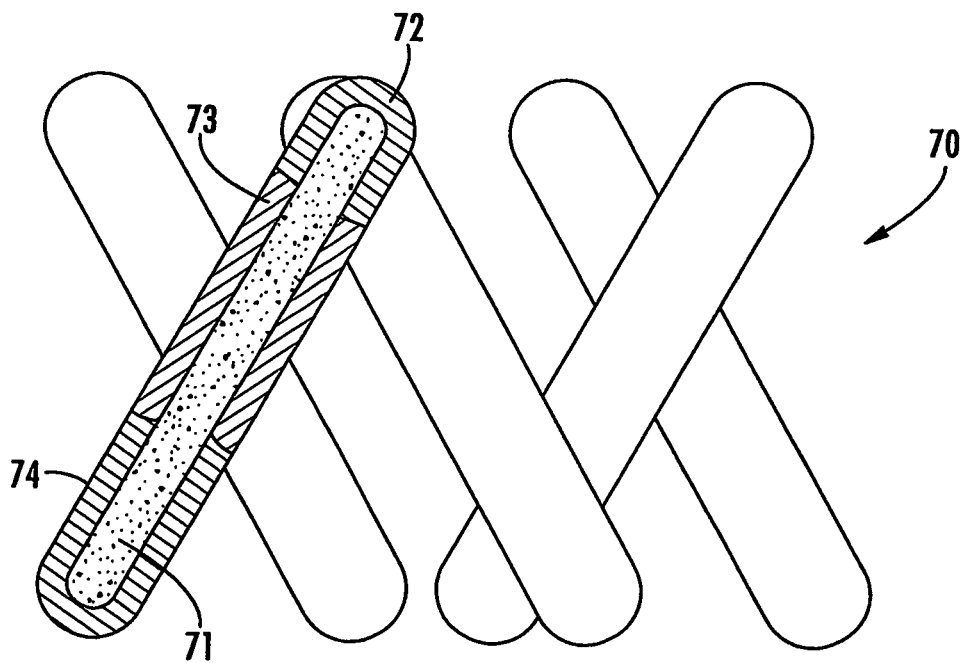
FIG. 7 depicts a rigid porous wall structure consisting of acicular mullite coated with a middle layer of alumina and barium oxide, an upper layer coated with platinum and a lower coated with platinum, rhodium and palladium.

Referring now to FIG. 7, therein is shown another highly preferred embodiment 70 of the instant invention wherein the Diesel oxidation, $NO_x$ absorption and three way catalyst functions are accomplished using separate layers. The middle layer is comprised of acicular mullite 71 coated with a mixture of alumina, platinum and barium oxide 73 which barium oxide serves as a $NO_x$ absorbent. The upper layer is comprised of the acicular mullite 71 coated with platinum 72 (or other suitable precious metal catalyst) which serves as a Diesel oxidation catalyst (preferably the platinum concentration is in the range of from 5-150 grams per 28.3 liters of the upper layer.) The lower layer is comprised of the acicular mullite 71 coated with a mixture comprised of precious metal catalysts 74 (preferably a mixture of platinum in the range of from 0.1 to 10 grams per liter, rhodium in the range of from 0.02 to 2 grams per liter and palladium in the range of from 0.1 to 10 grams per liter as well as other ingredients such as active alumina, cerium oxide and zirconium oxide, see, for example, U.S. Pat. No. 4,965,243. The embodiment shown in FIG. 7 is highly efficient both in operational performance and in economic use of expensive precious metals.

EXAMPLE 1

A Diesel exhaust filter having rigid porous wall portions comprising acicular mullite with dimensions of 2.5 centimeters×2.5 centimeters×7.6 centimeters long is prepared according to the teachings of U.S. Pat. No. 5,098,455. A liquid solution is prepared consisting of 3.0 grams of 8 wt % Methocel A15LV solution (The Dow Chemical Company, Midland, Mich., USA) and 30.0 grams of 26.7 wt % colloidal alumina suspension (Dispal 18N4-80, Sasol North America, Inc., Houston, Tex., USA). 13.2 grams of the solution is applied to the filter so that the porous walls of the Diesel exhaust filter is filled with the liquid. After the solution has evenly distributed itself in the Diesel exhaust filter, the filter is dried in an oven at 115° C. The Diesel exhaust filter is then calcined in an oven at 500° C. for one hour. Following calination, 0.091 g of Pt is applied to the calcined filter by immersing the calcined filter into a platinum nitrate solution (Heraeus Metal Processing, Inc., Santa Fe Springs, Calif., USA) After drying at 115° C., the filter is impregnated with an 80° C. solution of 10.0 g water and 1.56 g barium nitrate (Aldrich Chemical Co, Milwaukee, Wis., USA), then dried at 115° C. The dried filter is calcined at 600° C. for one hour to form a Diesel exhaust filter that will absorb nitrogen oxides. The intake channels of the Diesel exhaust filter are then coated by dipping one end of the filter 90% of the way into a wash coat suspension of 20.0 grams 1 wt % platinum on gamma-alumina prepared by wet impregnation (Catalox SBa-150, Sasol North America, Inc., Houston, Tex., USA), 2.0 grams Dispal 18N4-80 (Sasol North America, Inc., Houston, Tex., USA), 2.0 grams 8 wt % Methocel A15LV (The Dow Chemical Co., Midland, Mich., USA) and 77 g water so that only the intake side of the porous walls of the Diesel exhaust filter are coated with the particles to form a Diesel oxidation catalyst layer. The filter is oven dried at 115° C. The outlet channels of the Diesel exhaust filter are similarly coated by dipping the opposite end of the filter 90% of the way into a wash coat suspension prepared from 13.33 g 1.2% Pt on gamma-alumina (Catalox SBa-150, Sasol North America, Houston, Tex., USA), 6.67 g 0.24 wt % Rh on a coprecipitated 2:1 $CeO2:ZrO2$, 2.0 g Dispal 18N-4 (Sasol North America, Inc., Houston, Tex., USA), 2.0 grams 8 wt % Methocel A15LV (The Dow Chemical Co., Midland, Mich., USA) and 77 g water so that the outlet side of the porous walls of the Diesel exhaust filter are coated with the particles to form a three way catalyst layer. After the filter is dried, the Diesel exhaust filter was heated in an oven at 600° C. for one hour to produce a Diesel exhaust filter embodiment of the instant invention having porous wall portions like that shown in FIG. 5.

EXAMPLE 2

A Diesel exhaust filter having rigid porous wall portions comprising acicular mullite with dimensions of 2.5 centimeters×2.5 centimeters×7.6 centimeters long is prepared according to the teachings of U.S. Pat. No. 5,098,455. A liquid solution is prepared consisting of 3.0 grams of 8 wt % Methocel A15LV solution (The Dow Chemical Company, Midland, Mich., USA) and 30.0 grams of 26.7 wt % colloidal alumina suspension (Dispal 18N4-80, Sasol North America, Inc., Houston, Tex. USA). 13.2 grams of the solution is applied to the filter so that the porous walls of the Diesel exhaust filter are filled with the liquid. After the solution has evenly distributed itself in the Diesel exhaust filter, the filter is dried in an oven at 115° C. The Diesel exhaust filter is then calcined in an oven at 500° C. for one hour. Following calination, 0.091 g of Pt are applied to the calcined filter by immersing the calcined filter into a platinum nitrate solution (Heraeus Metal Processing, Inc., Santa Fe Springs, Calif., USA. After drying at 115° C., the filter is impregnated with an 80° C. solution of 10.0 g water and 1.56 g barium nitrate (Aldrich Chemical Co, Milwaukee, Wis., USA), then dried at 115° C. The dried filter is calcined at 600° C. for one hour to form a Diesel exhaust filter that will absorb nitrogen oxides. The intake channels of the Diesel exhaust filter are then coated by dipping one end of the filter 80% of the way into a wash coat suspension of 20.0 grams 1 wt % platinum on gamma-alumina prepared by wet impregnation (Catalox SBa-150, Sasol North America, Inc., Houston, Tex., USA), 2.0 grams Dispal 18N4-80 (Sasol North America, Inc., Houston, Tex., USA), 2.0 grams 8 wt % Methocel A15LV (The Dow Chemical Co., Midland, Mich., USA) and 77 g water so that only the intake side of the porous walls of the Diesel exhaust filter are coated with the particles to form a Diesel oxidation catalyst layer. The filter is oven dried at 115° C., then calcined at 600° C. to produce a Diesel exhaust filter embodiment of the instant invention having porous wall portions like that shown in FIG. 6.

EXAMPLE 3

A 2.5 liter Diesel exhaust filter having rigid porous wall portions comprising acicular mullite is prepared according to the teachings of U.S. Pat. No. 5,098,455. A liquid solution is prepared consisting of ten grams of Methocel A15LV (The Dow Chemical Co, Midland, Mich., USA), 160 grams of colloidal alumina particles (Dispal 18N4-80, Sasol North America, Inc., Houston, Tex., USA), and ten grams of platinum nitrate (Heraeus Metal Processing, Inc., Santa Fe Springs, Calif., USA), one gram of rhodium nitrate (Heraeus Metal Processing, Inc., Santa Fe Springs, Calif., USA), fifty grams of urea (Aldrich Chemical Co, Milwaukee, Wis., USA) in six hundred fifty grams of water. The Diesel exhaust filter is immersed in the liquid solution so that the porous walls of the Diesel exhaust filter are filled with the liquid solution. The Diesel exhaust filter is then sealed in a plastic bag and heated in a water bath at ninety five degrees Celsius for one day to gel the methocel and to decompose the urea to ammonia and carbon dioxide thereby precipitating the alumina and rhodium and platinum ions on the acicular mullite. The Diesel exhaust filter is then removed from the plastic bag and heated in an oven at one hundred five degrees Celsius for one day to remove water. The Diesel exhaust filter is then heated in an oven at five hundred degrees Celsius for one hour to calcine the part. The calcined filter is then impregnated with a solution of 100 g barium acetate in 500 g water, oven dried at 115° C., then calcined at 600 C for one hour to form a combined nitrogen oxide absorber and three way catalyst layer. The intake channels of the Diesel exhaust filter are then rinsed with a wash coat suspension of platinum on forty micrometer average diameter alumina particles (50 grams of platinum per 28.3 liters of filter) so that the intake side of the porous walls of the Diesel exhaust filter are coated with the alumina particles to form a system like that shown in FIG. 6.

What is claimed is:

1. An improved Diesel exhaust filter comprising a rigid porous wall that is comprised of an acicular ceramic, the porous wall having a first side and a second side, the porous wall having therein a Diesel oxidation catalyst layer and a $NO_x$ absorbent layer, wherein the Diesel oxidation catalyst layer is adjacent to the first side of the porous wall and the NOx absorbent layer is between the Diesel oxidation layer and second side of the porous wall.

2. The improved Diesel exhaust filter of claim 1, wherein the $NO_x$ absorbent is comprised of a barium salt, barium oxide or combination thereof.

3. The improved Diesel exhaust filter of claim 1, wherein the acicular ceramic is comprised of acicular mullite.

4. The improved Diesel exhaust filter of claim 1, wherein the NOx absorbent is present from 40 grams/liter to 570 grams/liter of the filter.

5. The improved Diesel exhaust filter of claim 4, further comprising a three way catalyst layer within the porous rigid wall, said third catalyst layer being between the second side and NOx absorbent layer.

6. An improved Diesel exhaust filter comprising a rigid porous wall that is comprised of an acicular ceramic, the porous wall having a first side and a second side, the filter having a Diesel oxidation catalyst layer, three way catalyst layer and a $NO_x$ absorbent layer, wherein the Diesel oxidation catalyst layer is adjacent to the first side of the porous wall, the three way catalyst layer is adjacent to the second side of the porous wall and at least a portion of the NOx absorbent layer is in the porous wall between the Diesel oxidation layer and three way catalyst layer.

7. The improved Diesel exhaust filter of claim 6, wherein the acicular ceramic is acicular mullite.

8. The improved Diesel exhaust filter of claim 6, wherein the Diesel oxidation catalyst is comprised of alumina particles impregnated and coated with platinum.

9. The improved Diesel filter of claim 6 wherein the NOx absorber is entirely within the porous filter wall.

10. The improved Diesel filter of claim 9 wherein each of the catalyst layers are within the porous filter wall.

* * * * *